US012170417B2

(12) United States Patent
Makino et al.

(10) Patent No.: US 12,170,417 B2
(45) Date of Patent: Dec. 17, 2024

(54) CONNECTOR CAPABLE OF ENSURING CONNECTION RELIABILITY WITH A CIRCUIT BOARD

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kenji Makino, Mie (JP); Yasunori Asano, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 482 days.

(21) Appl. No.: 17/615,209

(22) PCT Filed: May 27, 2020

(86) PCT No.: PCT/JP2020/020879

§ 371 (c)(1),
(2) Date: Nov. 30, 2021

(87) PCT Pub. No.: WO2020/255650

PCT Pub. Date: Dec. 24, 2020

(65) Prior Publication Data

US 2022/0231441 A1 Jul. 21, 2022

(30) Foreign Application Priority Data

Jun. 17, 2019 (JP) ................................ 2019-111752

(51) Int. Cl.
*H01R 12/88* (2011.01)
*H01R 43/16* (2006.01)

(52) U.S. Cl.
CPC ............ *H01R 12/88* (2013.01); *H01R 43/16* (2013.01)

(58) Field of Classification Search
CPC ...... H01R 12/71; H01R 12/72; H01R 12/724; H01R 12/727; H01R 12/82; H01R 12/88;
(Continued)

(56) References Cited

U.S. PATENT DOCUMENTS

2005/0245104 A1* 11/2005 Nakagawa ............ H01R 24/42 439/63
2009/0269986 A1* 10/2009 Satoh .................... H01R 12/79 439/630

(Continued)

FOREIGN PATENT DOCUMENTS

DE 4104215 A1 8/1992
JP H02056373 U * 4/1990 ............ H01R 12/00
JP 2011187213 A * 9/2011

OTHER PUBLICATIONS

English translated abstract of JP2011187213A (Year: 2011).*
International Search Report issued on Jul. 14, 2020 for WO 2020/255650 A1 (5 pages).

*Primary Examiner* — Abdullah A Riyami
*Assistant Examiner* — Amara Anderson
(74) *Attorney, Agent, or Firm* — Venjuris, P.C.

(57) ABSTRACT

It is aimed to provide a connector capable of ensuring connection reliability with a circuit board. A connector includes a housing and a terminal fitting to be disposed in the housing. The terminal fitting includes a terminal connecting portion to be connected to a mating terminal fitting, a board connecting portion to be connected to a circuit board and a shaft portion located between the terminal connecting por- (Continued)

tion and the board connecting portion. The housing includes a supporting portion for rotatably supporting the terminal fitting by being engaged with the shaft portion. The terminal fitting has a center of gravity on a side closer to the board connecting portion than the shaft portion.

8 Claims, 10 Drawing Sheets

(58) Field of Classification Search
CPC ........ H01R 43/16; H01R 13/40; H01R 13/42; H01R 13/193; H01R 13/428
See application file for complete search history.

(56) References Cited

U.S. PATENT DOCUMENTS

| | | | | | |
|---|---|---|---|---|---|
| 2011/0201222 | A1* | 8/2011 | Potters | H01R 12/57 | 439/345 |
| 2012/0149228 | A1* | 6/2012 | Matsumoto | H01R 12/724 | 439/329 |
| 2015/0311653 | A1* | 10/2015 | Ota | H01R 13/422 | 439/676 |
| 2019/0334288 | A1* | 10/2019 | Horii | H01R 13/422 | |

* cited by examiner

CONNECTOR CAPABLE OF ENSURING CONNECTION RELIABILITY WITH A CIRCUIT BOARD

CROSS REFERENCE TO RELATED APPLICATIONS

This application is a national phase of PCT application No. PCT/JP2020/020879, filed on 27 May 2020, which claims priority from Japanese patent application No. 2019-111752, filed on 17 Jun. 2019, all of which are incorporated herein by reference.

TECHNICAL FIELD

The present disclosure relates to a connector.

BACKGROUND

A connector described in Patent Document 1 includes a housing having a vertical wall, a first terminal to be press-fit into a first hole of the vertical wall and a second terminal to be press-fit into a second hole of the vertical wall. The first and second terminals respectively include a first leg portion and a second leg portion extending toward a member serving as a mounting destination (hereinafter, referred to as a circuit board).

PRIOR ART DOCUMENT

Patent Document

Patent Document 1: JP 2015-210899 A

SUMMARY OF THE INVENTION

Problems to be Solved

If the connector is heated using a heating device such as a reflow furnace, the housing and the circuit board may be deformed to warp due to a heat load. Since there is a difference in thermal expansion coefficient between the housing and the circuit board, if the housing and the circuit board are deformed, the housing may be partially lifted up from the circuit board and the first and second leg portions may be separated from the circuit board. As a result, it becomes difficult to adjust such that the first and second leg portions are located on the same plane and it may not be possible to ensure connection reliability with the circuit board.

Accordingly, it is aimed to provide a connector capable of ensuring connection reliability with a circuit board.

Means to Solve the Problem

The present disclosure is directed to a connector with a housing and a terminal fitting to be disposed in the housing, wherein the terminal fitting includes a terminal connecting portion to be connected to a mating terminal fitting, a board connecting portion to be connected to a circuit board and a shaft portion located between the terminal connecting portion and the board connecting portion, the housing includes a supporting portion for rotatably supporting the terminal fitting by being engaged with the shaft portion, and the terminal fitting has a center of gravity on a side closer to the board connecting portion than the shaft portion.

Effect of the Invention

According to the present disclosure, it is possible to provide a connector capable of ensuring the connection reliability of a board connecting portion with a circuit board.

DETAILED DESCRIPTION TO EXECUTE THE INVENTION

Description of Embodiments of Present Disclosure

Figure 1:
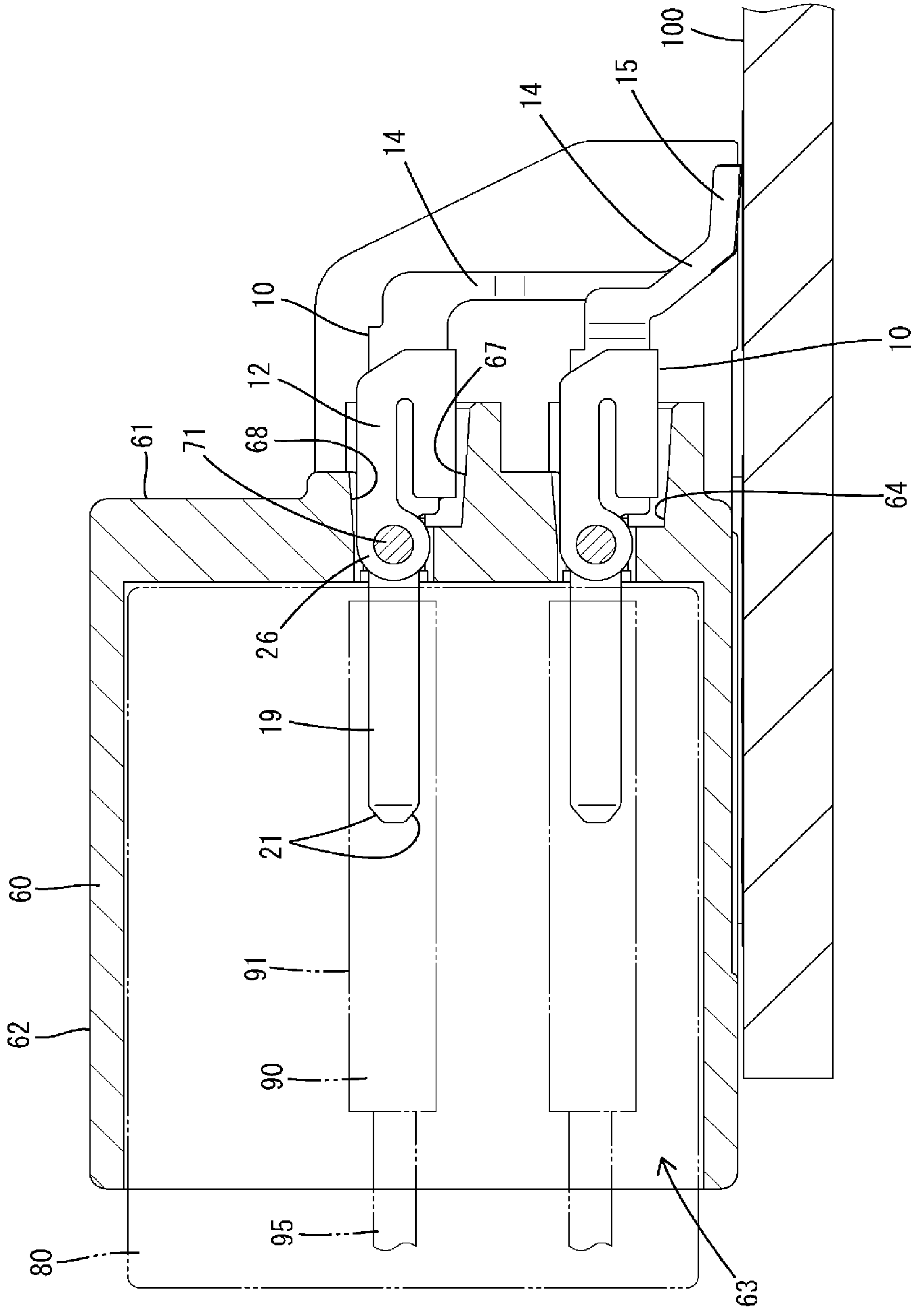
FIG. 1 is a side view in section showing a state where a housing is placed on a circuit board in a connector according to a first embodiment.

First, embodiments of the present disclosure are listed and described.

(1) The connector of the present disclosure includes a housing and a terminal fitting to be disposed in the housing, wherein the terminal fitting includes a terminal connecting portion to be connected to a mating terminal fitting, a board connecting portion to be connected to a circuit board and a shaft portion located between the terminal connecting portion and the board connecting portion, the housing includes a supporting portion for rotatably supporting the terminal fitting by being engaged with the shaft portion, and the terminal fitting has a center of gravity on a side closer to the board connecting portion than the shaft portion. Since the terminal fitting has the center of gravity on the side closer to the board connecting portion than the shaft portion, the board connecting portion constantly tries to rotate in a direction to contact the circuit board. Thus, even if the housing and the circuit board are deformed under a high heat environment of a reflow process or the like, a state of the board connecting portion in contact with the circuit board can be maintained and the connection reliability of the board connecting portion with the circuit board can be ensured.

(2) Preferably, the terminal fitting includes a base portion extending from the terminal connecting portion to the board connecting portion and a resilient portion provided side by side with the base portion, the resilient portion being deflectable and deformable toward the base portion, and the shaft portion is provided on the resilient portion. Since the shaft portion is provided on the deflectable and deformable resilient portion, the terminal fitting can be mounted while deflecting the resilient portion and a mounting operation can be easily performed in the process of the mounting the terminal fitting into the housing.

(3) The shaft portion may be provided on an end part of the resilient portion on the side of the terminal connecting portion. According to this configuration, the center of gravity of the terminal fitting can be located on the side closer to the board connecting portion than the shaft portion by the weight of the resilient portion. Therefore, it is not necessary to provide a dedicated structure for adjusting the center of gravity of the terminal fitting and the complication of the overall configuration can be avoided.

(4) The resilient portion may be deflected and deformed in a direction orthogonal to a rotating direction of the terminal fitting. According to this configuration, an influence of the deflection of the resilient portion on the rotation of the terminal fitting can be reduced and the state of the board connecting portion in contact with the circuit board can be satisfactorily maintained.

(5) The shaft portion may include a first shaft portion provided on the resilient portion and a second shaft portion provided to project on a surface of the base portion on a side opposite to a side facing the resilient portion. The first shaft portion is deeply engaged with and support by the corresponding supporting portion by being accompanied by the deflection of the resilient portion. On the other hand, since the resilient portion is deflectable and deformable, the first shaft portion may not be stably supported by the corresponding supporting portion. However, in the case of the above configuration, since the shaft portion includes the first and second shaft portions and the second shaft portion is provided to project on the surface of the base portion on the side opposite to the side facing the resilient portion, the second shaft portion is stably supported by the corresponding supporting portion and the shaft portions are satisfactorily supported by the supporting portions as a whole.

(6) The terminal fitting may include a strain relief portion for allowing relative displacements of the terminal connecting portion and the board connecting portion at a position different from the shaft portion between the terminal connecting portion and the board connecting portion. When the terminal fitting rotates, the terminal connecting portion may be displaced from a predetermined position where the terminal connecting portion is connected to the mating terminal fitting. This case can be dealt with by providing a guiding structure or the like for guiding the mating terminal fitting to the terminal connecting portion, but a stress received from the mating terminal fitting increases and a load is applied to the board connecting portion. In that respect, according to the above configuration, a stress applied to a part where the terminal connecting portion is connected to the mating terminal fitting is relaxed by the strain relief portion and, consequently, a load applied to the board connecting portion is also relaxed. As a result, the connection reliability of the entire terminal fitting can be ensured.

(7) The terminal connecting portion, the board connecting portion and the shaft portion may be integrally provided by bending a metal plate. According to this configuration, the terminal fitting can be easily manufactured by bending.

(8) The terminal connecting portion may be configured by folding the metal plate into two or more layers. According to this configuration, the strength of the terminal connecting portion can be increased to withstand connection to the mating terminal.

Details of Embodiment of Present Disclosure

Specific examples of a connector of the present disclosure are described with reference to the drawings. Note that the present disclosure is not limited to this illustration and is intended to be represented by claims and include all changes in the scope of claims and in the meaning and scope of equivalents.

First Embodiment

A connector according to a first embodiment includes a housing 60 and terminal fittings 10 disposed in the housing 60 as shown in FIG. 1. The housing 60 is made of synthetic resin and connected to a mating housing 80. The terminal fitting 10 is made of conductive metal and electrically connected to a mating terminal fitting 90 provided in the mating housing 80. The mating terminal fitting 90 is a female terminal fitting including a tubular box portion 91 and is connected to an end part of a wire 95.

<Housing 60>

The housing 60 is placed on the upper surface of a circuit board 100. As shown in FIG. 1, the housing 60 includes a back wall 61 arranged along a vertical direction and a peripheral wall 62 in the form of a rectangular tube projecting forward (leftward of FIG. 1) from the outer peripheral edge of the back wall 61. The housing 60 has a fitting space 63 open forward inside. The mating housing 80 is fit and inserted into the fitting space 63.

Figure 4:
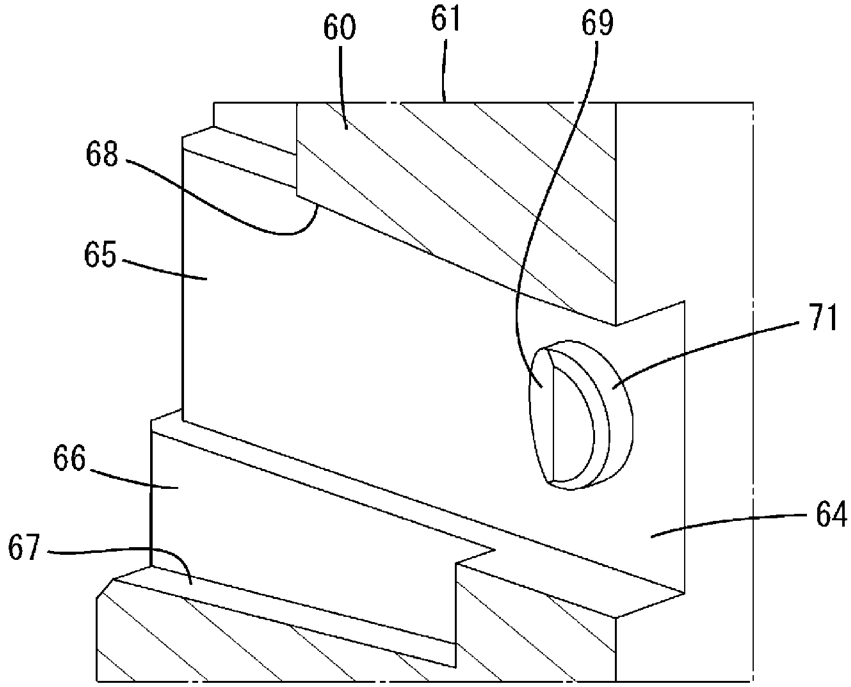
FIG. 4 is a perspective view partly in section of a first supporting portion in the housing viewed obliquely from an upper-front side in the connector according to the first embodiment.
Figure 5:
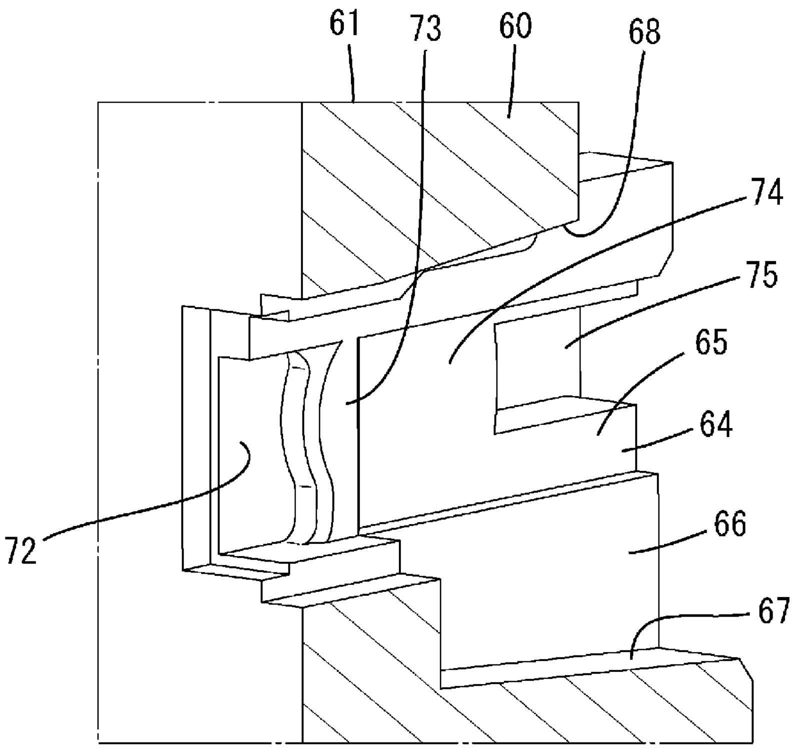
FIG. 5 is a perspective view partly in section of a second supporting portion and the groove portion in the housing viewed obliquely from the upper-front side in the connector according to the first embodiment.

The back wall 61 includes a plurality of insertion holes 64. The respective insertion holes 64 are provided in two upper and lower rows in a part of the back wall 61 having a large thickness in a front-rear direction. The terminal fittings 10 are inserted into the insertion holes 64 from behind. As shown in FIGS. 4 and 5, the insertion hole 64 includes a main hole portion 65 penetrating through the back wall 61 in the front-rear direction and a sub-hole portion 66 open in the bottom surface of the main hole portion 65. The sub-hole portion 66 extends in the front-rear direction, the front end thereof is located in an intermediate part in the front-rear direction of the main hole portion 65 and the rear end thereof is open in the rear surface of the back wall 61. The sub-hole portion 66 has a region 67 inclined downward toward a rear side on a lower surface (bottom surface). The main hole portion 65 has a region 68 inclined upward toward the rear side at a position of an upper surface facing the inclined region 67 of the sub-hole portion 66.

The back wall 61 includes first supporting portions 71 and second supporting portions 72 on both side surfaces of the main hole portions 65 of the insertion holes 64. As shown in FIG. 4, the first supporting portion 71 is in the form of a projection projecting on the side surface on one side of the main hole portion 65. The first supporting portion 71 has a slant 69 obliquely cut in a rear part of a tip side of a cylindrical part.

Figure 2:
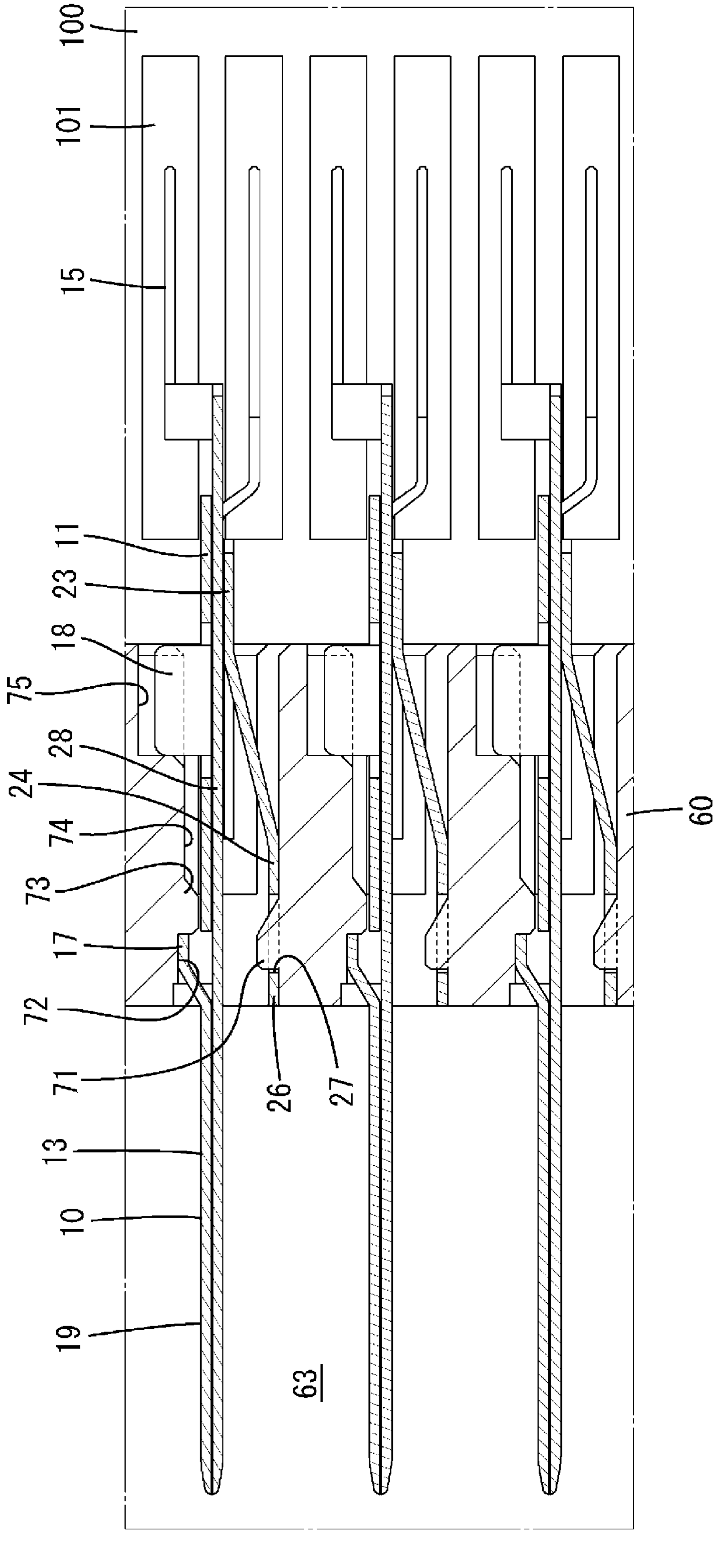
FIG. 2 is a top view in section showing a state where shaft portions are supported by supporting portions and stabilizers are accommodated in groove portions in the connector according to the first embodiment.

As shown in FIG. 5, the second supporting portion 72 is in the form of a recess open in the side surface on the other side of the main hole portion 65. As shown in FIG. 2, the second supporting portion 72 is arranged at a position overlapping the first supporting portion 71 in the front-rear direction in a front part of the main hole portion 65. The second supporting portion 72 has a flat side surface (bottom surface), extends in the front-rear direction while having a constant height, and is open in the front surface of the back wall 61. The rear surface of the second supporting portion 72 is curved.

The main hole portion 65 includes an interfering portion 73 on the side surface on the other side. Out of both front and rear sides across the interfering portion 73 on the side surface on the other side of the main hole portion 65, the aforementioned second supporting portion 72 is provided on the front side and a recess 74 is provided on the rear side. The recess 74 has a flat side surface (bottom surface), extends in the front-rear direction and is open in the rear surface of the back wall 61.

Further, as shown in FIG. 5, the main hole portion 65 includes a groove portion 75 open in a side surface (bottom surface) of the recess 74 in the side surface on the other side. The groove portion 75 has a flat side surface (bottom surface), extends in the front-rear direction and is open in the rear surface of the back wall 61. The front surface of the groove portion 75 is formed to be flat along a lateral direction in an intermediate part in the front-rear direction of the recess 74. As shown in FIG. 2, the groove portion 75 is laterally recessed deeper than the second supporting portion 72 and the recess 74.

<Terminal Fittings 10>

Figure 6:
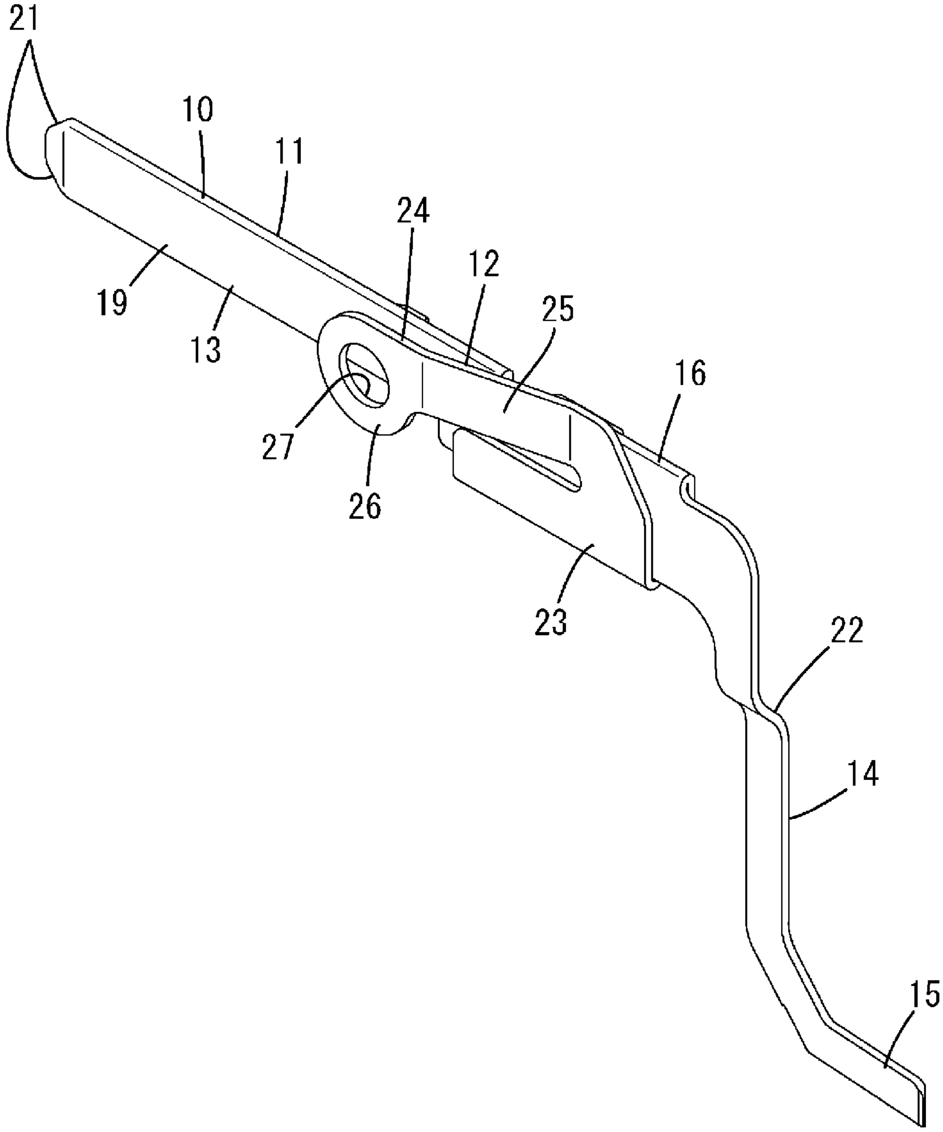
FIG. 6 is a perspective view of a terminal fitting viewed obliquely from an upper-rear side on a right side in the connector according to the first embodiment.
Figure 7:
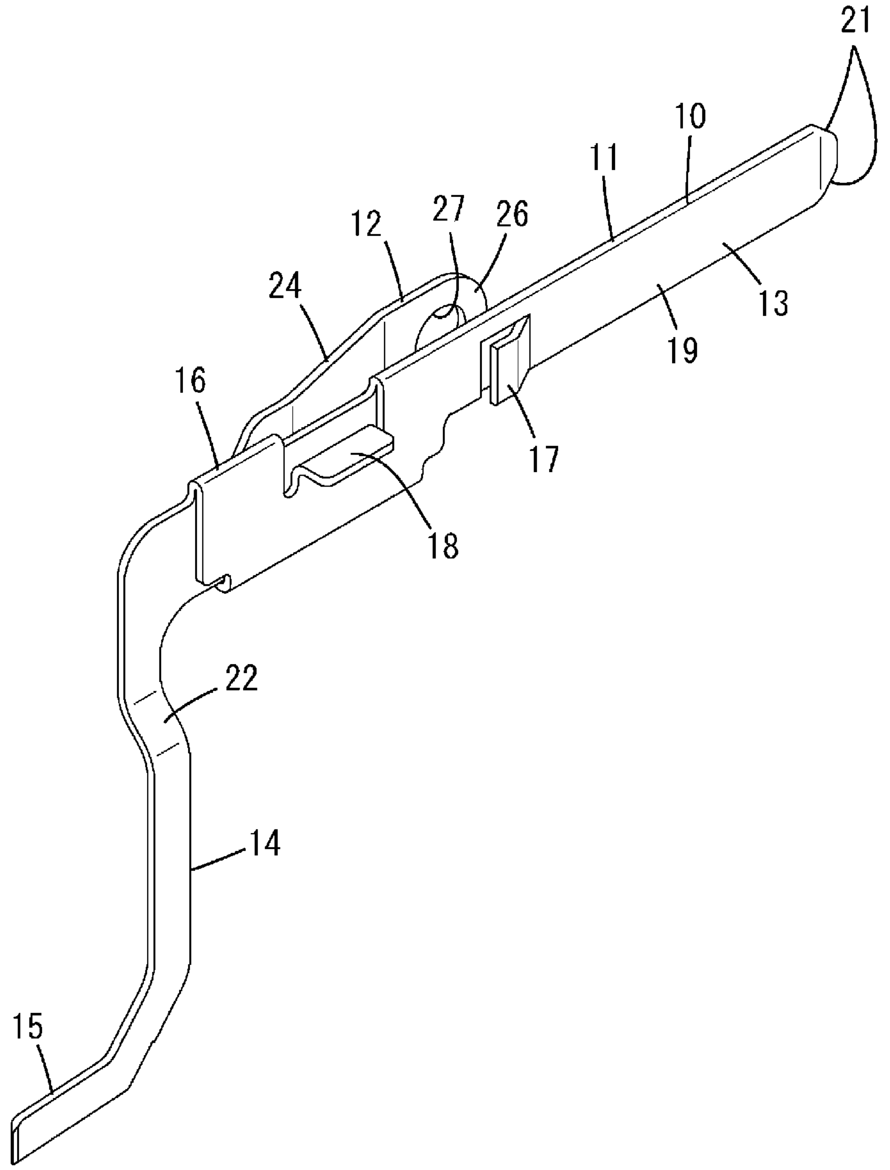
FIG. 7 is a perspective view of the terminal fitting viewed obliquely from an upper-rear side on a left side in the connector according to the first embodiment.
Figure 8:
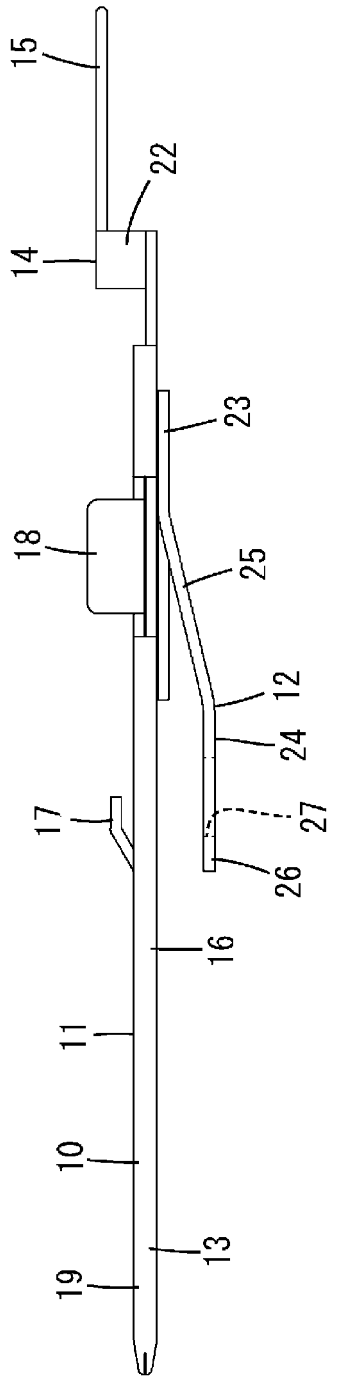
FIG. 8 is a plan view of the terminal fitting in the connector according to the first embodiment.

The terminal fitting 10 is integrally formed, such as by bending after one conductive metal plate is stamped into a predetermined shape. As shown in FIGS. 6 to 8, the terminal fitting 10 includes a base portion 11 having plate surfaces arranged along the vertical direction and extending over an entire length, and a resilient portion 12 having plate surfaces arranged along the vertical direction and arranged to face a side surface on the one side of the base portion 11. The resilient portion 12 is connected to the base portion 11 and arranged side by side with the base portion 11 in a plate thickness direction (lateral direction).

The base portion 11 includes an inserting portion 13 extending in the front-rear direction, an extending portion 14 extending downward from a rear end side of the inserting portion 13 and a board connecting portion 15 extending rearward from a lower end side of the extending portion 14. The inserting portion 13 is formed by a plate material doubly folded into close contact in the plate thickness direction except on the rear end side, and includes a folded portion 16 along the front-rear direction on an upper end.

As shown in FIG. 7, the inserting portion 13 is formed with a gate-shaped cut open rearward in the plate material on the other side in an intermediate part in the front-rear direction, and a plate piece part in the cut is bent and raised to form a second shaft portion 17. The second shaft portion 17 is configured as a rectangular plate piece part cantilevered rearward on a side surface on the other side of the inserting portion 13. The second shaft portion 17 is formed such that a tip side (free end side) extends in the front-rear direction after being inclined outward toward the rear side in a plan view. As shown in FIG. 2, the second shaft portion 17 enters the second supporting portion 72 and is supported by the second supporting portion 72.

As shown in FIG. 7, the inserting portion 13 is formed with a gate-shaped cut open upward in a part of the plate material on the other side behind the second shaft portion 17, and a plate piece part in the cut is bent and raised to form a stabilizer 18. The stabilizer 18 is a rectangular plate piece part projecting laterally on the side surface on the other side of the inserting portion 13, and is entirely arranged along the front-rear direction. A lateral projection amount of the stabilizer 18 is larger than that of the second shaft portion 17. As shown in FIG. 2, the stabilizer 18 enters the groove portion 75.

A part of the base portion 11 forward of the second shaft portion 17 is configured as a terminal connecting portion 19. The terminal connecting portion 19 is formed by parts of the plate material laterally held in close contact with each other, and side surfaces (plate surfaces) thereof are arranged along the vertical direction. As shown in FIG. 1, the terminal connecting portion 19 includes a guiding portion 21 tapered toward a tip on a front end edge. The terminal connecting portion 19 is inserted into the box portion 91 of the mating terminal fitting 90 while being guided by the guiding portion 21 when the connectors are connected. The side surfaces of the terminal connecting portion 19 serve as contact point parts for contacting connection parts provided in the box portion 91 of the mating terminal fitting 90.

The extending portion 14 is formed by a plate material continuous with and extending from the plate material on the one side of the inserting portion 13. The extending portion 14 includes a bend portion 22 obliquely bent toward the other side in an upper part. Out of both upper and lower sides across the bend portion 22 in the extending portion 14, a part on the lower side is arranged while being displaced more toward the other side than a part on the upper side together with the board connecting portion 15.

In the case of the terminal fitting 10 to be inserted into the insertion hole 64 in the upper row, the bend portion 22 is bent toward the other side as described above. On the other hand, although not shown, the bend portion 22 is bent toward the one side in the case of the terminal fitting 10 to be inserted into the insertion hole 64 in the lower row.

A lower end part of the extending portion 14 is inclined downward toward the rear side. As shown in FIG. 1, in the case of the terminal fitting 10 to be inserted into the insertion hole 64 in the lower row, the extending portion 14 has no part extending in the vertical direction and is entirely inclined downward toward the rear side.

Figure 3:
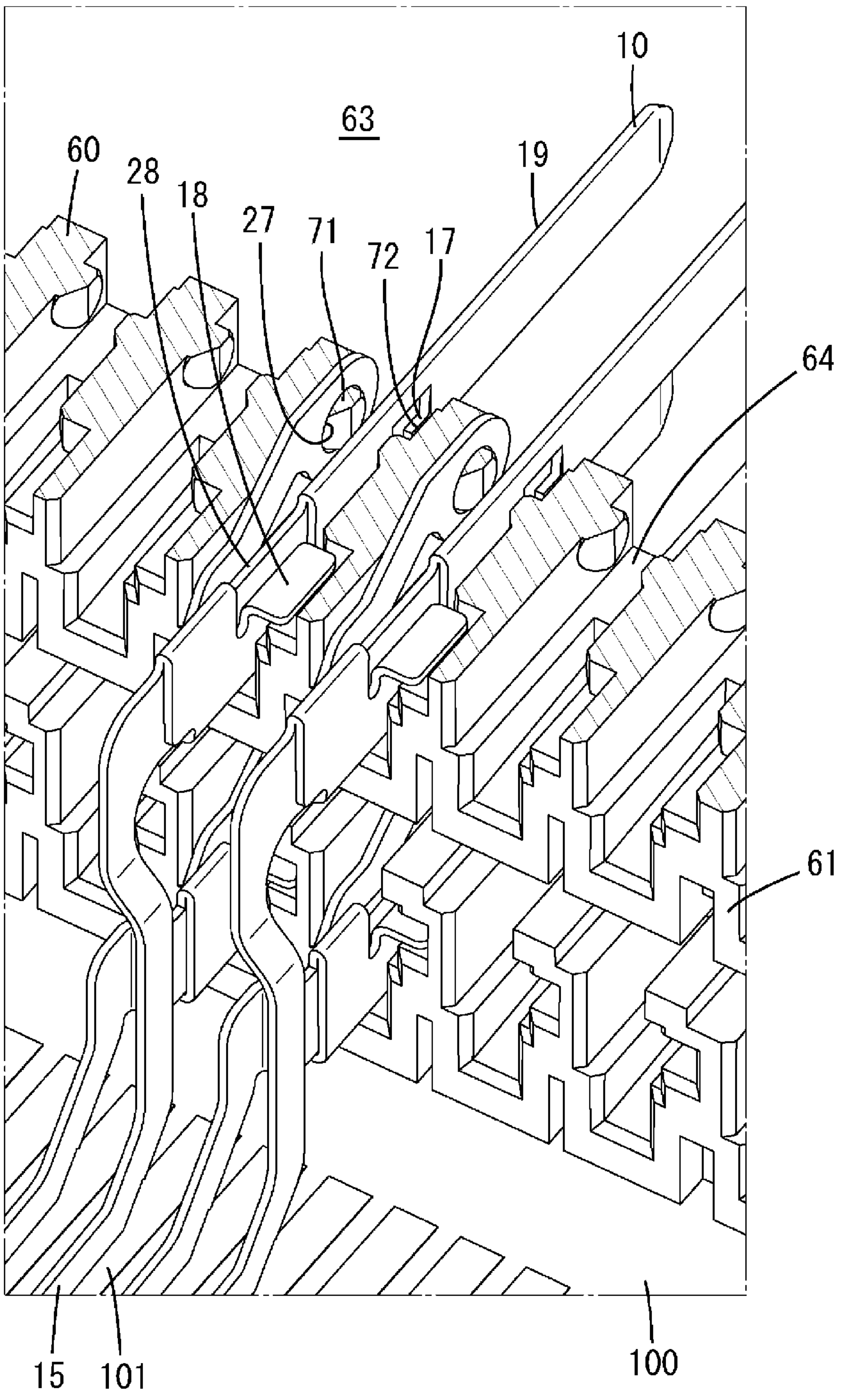
FIG. 3 is a perspective view partly in section viewed obliquely from an upper-rear side showing the state where the shaft portions are supported by the supporting portions and the stabilizers are accommodated in the groove portions in the connector according to the first embodiment.

The board connecting portion 15 is configured as a plate piece part bent and connected to the rear end of the lower end part of the extending portion 14 and long in the front-rear direction. The lower end of the board connecting portion 15 is a plate thickness surface along the front-rear direction and arranged along a surface of the circuit board 100. As shown in FIGS. 2 and 3, the lower end of the board connecting portion 15 is connected to a conductive portion 101 formed on the surface of the circuit board 100 by reflow soldering.

As shown in FIG. 6, the resilient portion 12 includes a fixed end portion 23 folded upward from the lower end of the plate material on the other side of the inserting portion 13 and arranged in close contact with the side surface on the one side of the inserting portion 13, and a resilient body portion 24 projecting forward from the fixed end portion 23. The fixed end portion 23 has a lower part extending in the front-rear direction and an upper part projecting on a rear end side of the lower part.

The resilient body portion 24 includes a projecting portion 25 projecting forward from the upper part of the fixed end portion 23 while being separated from the inserting portion 13, and a first shaft portion 26 connected to the front end of the projecting portion 25 and arranged along the front-rear direction. The first shaft portion 26 has a ring shape and is arranged in parallel to the inserting portion 13 while being spaced apart from the side surface on the one side of the inserting portion 13. The first shaft portion 26 of the resilient body portion 24 is deflectable and deformable in the plate thickness direction (lateral direction) with a part where the projecting portion 25 is connected to the fixed end portion 23 as a fulcrum. The first shaft portion 26 includes a circular bearing hole 27 penetrating in the plate thickness direction in a central part. As shown in FIG. 2, the first supporting portion 71 is inserted and fit into the bearing hole 27, whereby the first shaft portion 26 is supported by the first supporting portion 71.

The first and second shaft portions 26, 17 are arranged at positions overlapping in the front-rear direction on both left and right sides across an intermediate part in the front-rear direction of the inserting portion 13. A part (fixed end portion 23 and projecting portion 25) of the resilient portion 12 except the first shaft portion 26 is located rearward of the first shaft portion 26 in a rear part of the inserting portion 13. A center of gravity of the terminal fitting 10 is located on the side of the board connecting portion 15 behind and below the first and second shaft portions 26, 17.

<Overall Structure of Connector>

The inserting portion 13 of the terminal fitting 10 is inserted into the corresponding insertion hole 64 of the housing 60 from behind. In the process of inserting the inserting portion 13 into the insertion hole 64, the second shaft portion 17 enters the recess 74 to avoid interference with the back wall 61. Further, the resilient portion 12 enters a space behind the first supporting portion 71 and the stabilizer 18 enters the groove portion 75, whereby interference with the back wall 61 is similarly avoided. Further, a rear-lower part of the inserting portion 13 and a lower part of the fixed end portion 23 enter the sub-hole portion 66 to escape.

Immediately before the inserting portion 13 is properly inserted into the insertion hole 64, the first shaft portion 26 interferes with the first supporting portion 71 and the resilient body portion 24 slides on the slant 69 of the first supporting portion 71 to be deflected and deformed. When the inserting portion 13 is properly inserted into the insertion hole 64, the resilient body portion 24 resiliently returns and the first supporting portion 71 is fit into the bearing hole 27 of the first shaft portion 26 (see FIGS. 2 and 3). Further, the second shaft portion 17 resiliently rides over the interfering portion 73 and enters the second supporting portion 72. The stabilizer 18 comes into contact with the front surface of the groove portion 75 to stop an inserting operation (insertion) of the terminal fitting 10. The terminal connecting portion 19 in the front part of the inserting portion 13 is arranged to project into the fitting space 63 of the housing 60.

Out of the inserting portion 13 of the terminal fitting 10, a predetermined range from the intermediate part in the front-rear direction including the first and second shaft portions 26, 17 to the extending portion 14 serves as an insertion portion 28 to be inserted into the insertion hole 64. The rear end side of the fixed end portion 23 is arranged to be exposed behind the back wall 61 without being inserted into the insertion hole 64. The insertion portion 28 is arranged with clearances formed in the vertical direction between the insertion portion 28 and the upper and lower surfaces of the insertion hole 64 (main hole portion 65 and sub-hole portion 66). These clearances gradually become larger toward the rear side in the respective inclined regions 67, 68 of the main hole portion 65 and the sub-hole portion 66 as shown in FIG. 1.

The terminal fitting 10 is rotatable (pivotable) with respect to the back wall 61 of the housing 60 about a rotation center position where the first shaft portion 26 is engaged with the first supporting portion 71 and the second shaft portion 17 is engaged with the second supporting portion 72 in the range of the above clearances. In short, the rotation center position corresponds to the position of the first and second shaft portions 26, 17.

Since the center of gravity position of the terminal fitting 10 is set behind the first and second shaft portions 26, 17, the terminal fitting 10 is rotatable about the rotation center position in a direction in which the board connecting portion 15 contacts the circuit board 100. Thus, if the connector is placed on the circuit board 100, the board connecting portion 15 comes into contact with the surface of the circuit board 100 and constantly maintains a contact state with the circuit board 100.

If the connector is carried into an unillustrated reflow furnace and solder applied to the surface of the circuit board 100 is heated and melted, the solder adheres to the board connecting portions 15. Thereafter, the solder is cooled and solidified, whereby the board connecting portions 15 are electrically connected to the conductive portions 101 on the surface of the circuit board 100. Even if the housing 60 and the circuit board 100 are deformed due to heat in the reflow furnace, the board connecting portions 15 are resiliently pressed against the surface of the circuit board 100 in a rotating direction of the terminal fittings 10 and maintain the state in contact with the surface of the circuit board 100.

Note that if the terminal fitting 10 rotates about the rotation center position, the first supporting portion 71 slides in a circumferential direction in the bearing hole 27 of the first shaft portion 26 and the tip side of the second shaft portion 17 is displaced along a curved part of the rear surface of the second supporting portion 72. At this time, a rear part of the inserting portion 13 largely swings, but does not interfere with the upper and lower surfaces of the insertion hole 64 since the respective inclined regions 67, 68 of the main hole portion 65 and the sub-hole portion 66 are positioned to face each other. Further, since the stabilizer 18 is displaced in the groove portion 75 during the rotation of the terminal fitting 10, the stabilizer 18 does not interfere with the wall surface of the groove portion 75. As a result, the smoothness of the rotation of the terminal fitting 10 is ensured.

As described above, according to the first embodiment, the center of gravity of the terminal fitting 10 is set behind the shaft portions 17, 26 and the rotating direction of the terminal fitting 10 is set to the direction in which the board connecting portion 15 contacts the circuit board 100. Thus, with the terminal fitting 10 supported by the supporting portions 71, 72, the board connecting portion 15 can maintain the state in contact with the surface of the circuit board 100. As a result, the connection reliability of the board connecting portion 15 with the circuit board 100 can be ensured.

Further, the terminal fitting 10 includes the resilient portion 12 as well as the base portion 11. In the process of mounting the terminal fitting 10 into the housing 60, the resilient body portion 24 of the resilient portion 12 interferes with the first supporting portion 71 to be deflected and deformed toward the base portion 11. When the mounting is completed, the resilient body portion 24 returns and the first supporting portion 71 is fit to the first shaft portion 26. Here, the first shaft portion 26 is provided in the front part (part on the side of the terminal connecting portion 19) of the resilient portion 12. Thus, the center of gravity of the terminal fitting 10 can be set in the rear part (side of the board connecting portion 15) by the weight of the resilient portion 12. Therefore, it is not necessary to provide a dedicated structure for adjusting the center of gravity of the terminal fitting 10.

Further, since the resilient body portion 24 is deflected and deformed in a direction orthogonal to the rotating direction of the terminal fitting 10, the deflection of the resilient body portion 24 and the rotation of the terminal fitting 10 can be prevented from interfering with each other and the state of the board connecting portion 15 in contact with the circuit board 100 can be more satisfactorily maintained.

Further, the first shaft portion 26 is provided in the resilient portion 12 arranged on the side surface on the one side of the base portion 11, the second shaft portion 17 is provided to project on the side surface on the other side of the base portion 11, the first shaft portion 26 is deeply engaged with and supported by the first supporting portion 71, and the second shaft portion 17 is stably supported by the second supporting portion 72. Thus, the terminal fitting 10 is entirely satisfactorily supported in the housing 60.

Further, the terminal fitting 10 including the terminal connecting portion 19, the board connecting portion 15 and the shaft portions 17, 26 is integrally formed by bending one metal plate. Thus, the terminal fitting 10 can be easily manufactured.

Second Embodiment

Figure 9:
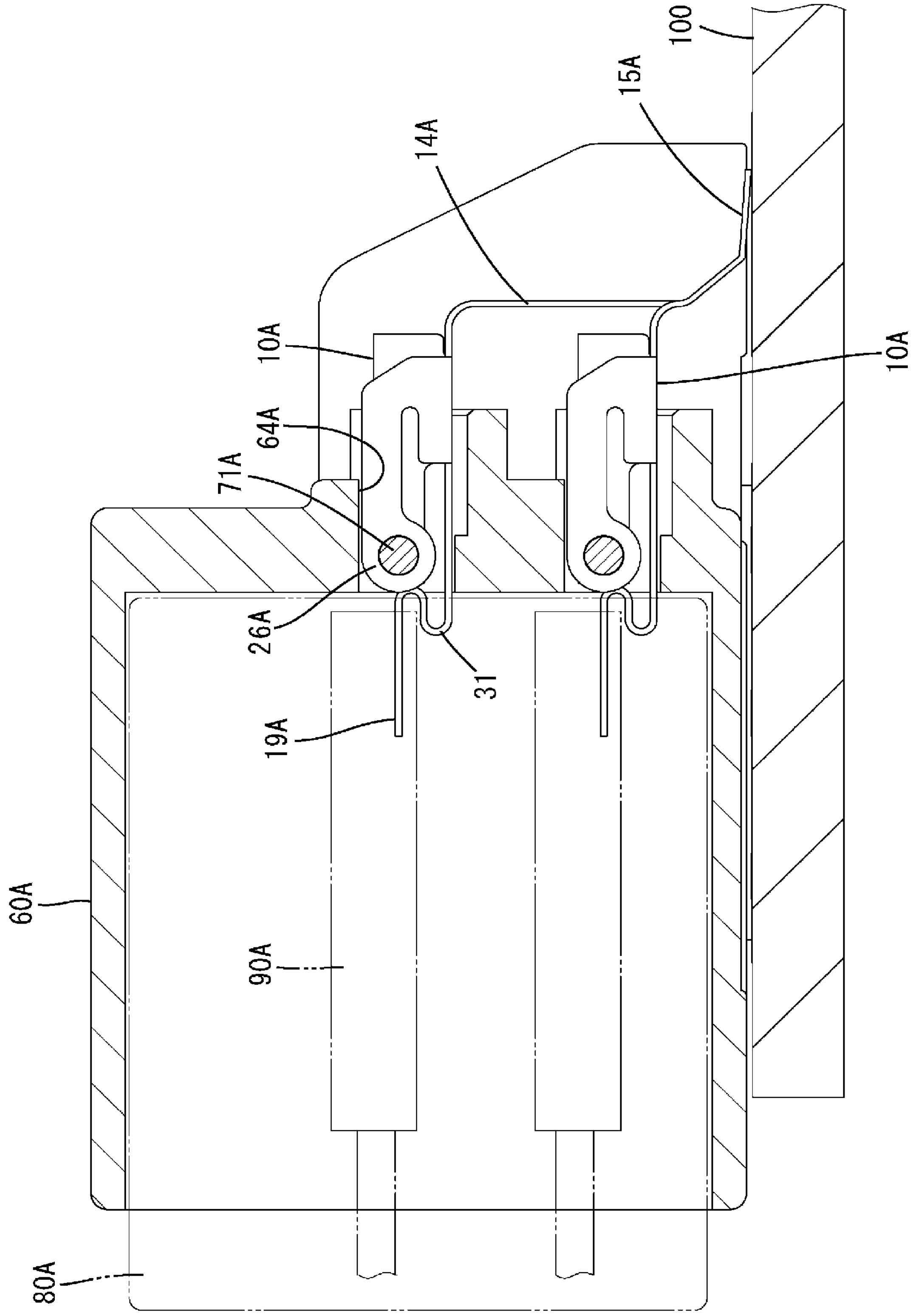
FIG. 9 is a side view in section showing a state where a housing is placed on a circuit board in a connector according to a second embodiment.
Figure 10:
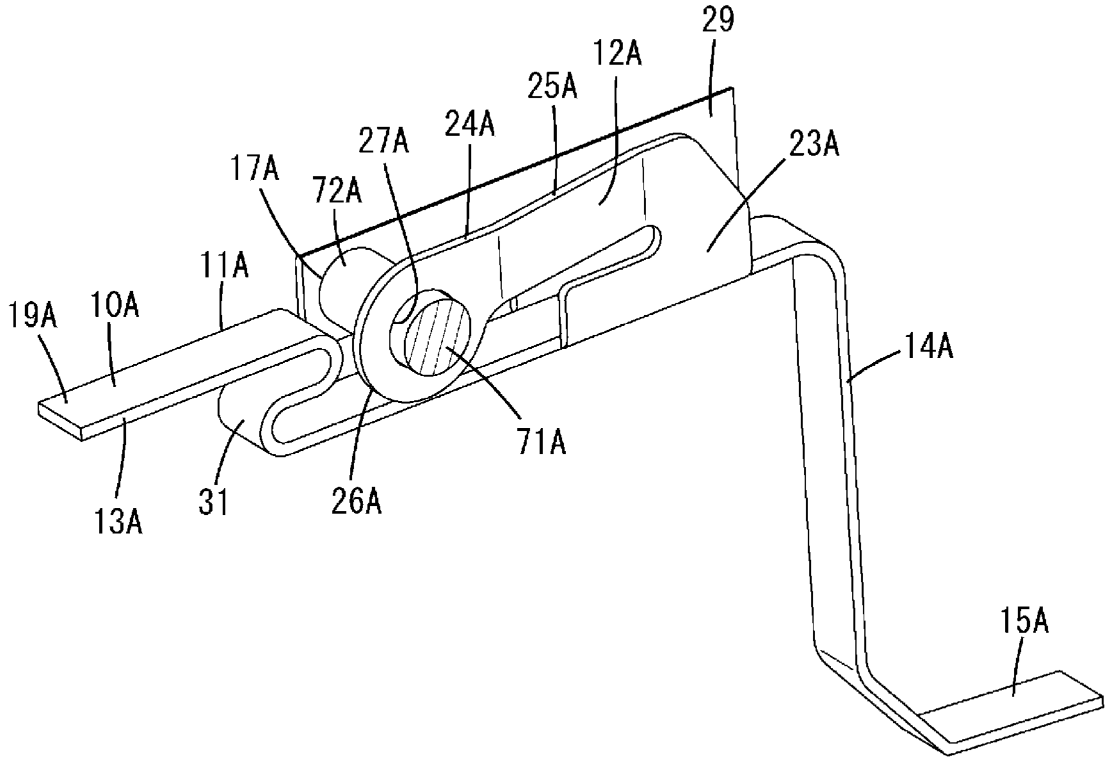
FIG. 10 is a perspective view of a terminal fitting viewed obliquely from an upper-front side in the connector according to the second embodiment.
Figure 11:
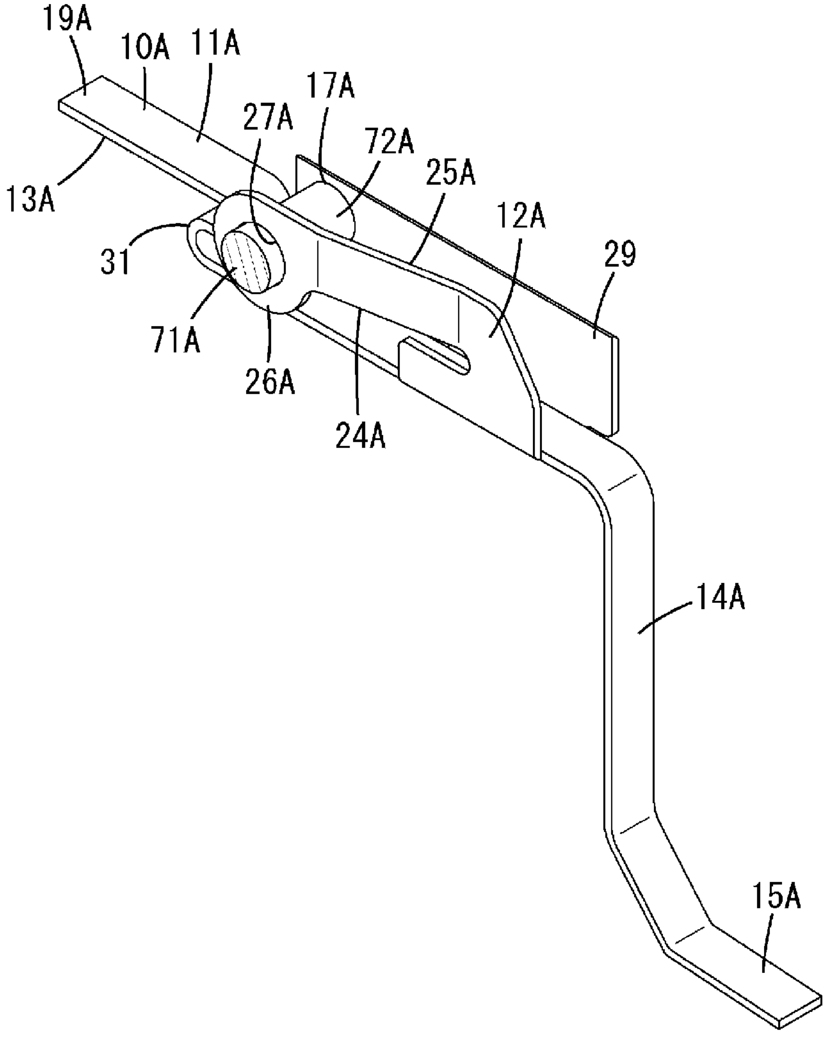
FIG. 11 is a perspective view of the terminal fitting viewed obliquely from an upper-rear side in the connector according to the second embodiment.

FIGS. 9 to 11 show a connector of a second embodiment. As shown in FIG. 9, the connector includes a housing 60A and terminal fittings 10A disposed in the housing 60A, and differs from the first embodiment in the shape of the terminal fittings 10A. Besides the terminal fittings 10A, many parts are common to the first embodiment and the description of the common parts is not repeated.

The terminal fitting 10A is integrally formed, such as by bending after one conductive metal plate is stamped into a predetermined shape. As shown in FIGS. 10 and 11, the terminal fitting 10A includes a base portion 11A having plate surfaces arranged along a lateral direction, a resilient portion 12A rising from an edge part on one side of the base portion 11A and having plate surfaces arranged along a vertical direction, and a facing portion 29 rising from a side edge on the other side of the base portion 11A.

The base portion 11A includes an inserting portion 13A extending in a front-rear direction over the entire length of the terminal fitting 10A as a whole, an extending portion 14A extending downward from a rear end side of the inserting portion 13A and a board connecting portion 15 extending rearward from a lower end side of the extending portion 14A.

The inserting portion 13A includes a terminal connecting portion 19A along the front-rear direction in a front end part and an insertion portion 28A along the front-rear direction in a rear part. Connection parts of a mating terminal fitting 90 provided in a mating housing 80A contact the upper and lower plate surfaces of the terminal connecting portion 19A, whereby the terminal connecting portion 19 is electrically connected to the mating terminal fitting 90A. As shown in FIG. 9, the insertion portion 28A is inserted into an insertion hole 64A of the housing 60A. The inserting portion 13A includes a strain relief portion 31 between the terminal connecting portion 19A and the insertion portion 28A. The strain relief portion 31 is curved into an S shape in a side view from the rear end of the terminal connecting portion 19A to the front end of the insertion portion 28A. The terminal connecting portion 19A and the insertion portion 28A are allowed to be relatively displaced in the vertical direction via the strain relief portion 31.

The extending portion 14A includes a part bent and extending vertically downward from the rear end of the inserting portion 13A and a part inclined downward toward a rear side on a lower end side. The front and rear surfaces of the extending portions 14A are plate surfaces.

A board connecting portion 15 is configured as a plate piece part bent and connected to the lower end of the extending portion 14 and having plate surfaces facing upward and downward. The lower surface (plate surface) of the board connecting portion 15A is arranged along a surface of a circuit board 100 and connected to a conductive portion formed on the surface of the circuit board 100 by reflow soldering.

As shown in FIGS. 10 and 11, the resilient portion 12A includes a fixed end portion 23A connected at a right angle to a side edge on the one side of the insertion portion 28A, a projecting portion 25A projecting forward from an upper part of a rear end side of the fixed end portion 23A and a first shaft portion 26A connected to the front end of the projecting portion 25A and arranged along the front-rear direction. The projecting portion 25A and the first shaft portion 26A constitute a resilient body portion 24A. The resilient body portion 24A is deflectable and deformable in the lateral direction (plate thickness direction of the resilient body portion 24A) with a rear end part where the projecting portion 25A is connected to the fixed end portion 23A as a fulcrum. The first shaft portion 26A includes a circular bearing hole 27A penetrating in the lateral direction in a central part. The facing portion 29 is in the form of a rectangular plate long in the front-rear direction and includes a second shaft portion 17A at a position overlapping the bearing hole 27A in the front-rear direction. The first and second shaft portions 26A, 17A are engaged with and supported by supporting portions 71A, 72A provided in the housing 60A to specify a rotation center position. Note that, as in the first embodiment, the supporting portions are composed of a first supporting portion 71A corresponding to the first shaft portion 26A and a second supporting portion 72A corresponding to the second shaft portion 17A, and provided in the housing 60A. In FIGS. 10 and 11, the supporting portions 71A, 72A are shown in a simplified manner.

The first shaft portion 26A is provided in a front end part of the resilient portion 12A, and the second shaft portion 17A is provided in a front end part of the facing portion 29. From this, a center of gravity of the terminal fitting 10A is set on the side of the board connecting portion 15A behind the first and second shaft portions 26A, 17A.

Here, by inserting the insertion portion 28A into the insertion hole 64A and engaging the first and second shaft portions 26A, 17A with the supporting portions 71A, 72A, the terminal fitting 10A becomes rotatable about the rotation center position. At this time, the strain relief portion 31 is arranged to project into a fitting space 63 of the housing 60A together with the terminal connecting portion 19A.

Even if the housing 60A and the circuit board 100 are deformed under a high heat environment of a reflow process, a state of the board connecting portion 15A in contact with the surface of the circuit board 100 can be maintained and the connection reliability of the board connecting portion 15A with the circuit board 100 can be ensured since the terminal fitting 10A is rotatable toward the circuit board 100 as in the first embodiment.

Further, in the case of the second embodiment, even if a stress is applied to a connected part of the terminal connecting portion 19A and the mating terminal fitting 90A, the strain relief portion 31 can be flexibly deformed to relax the stress. As a result, a load transmitted from the mating terminal fitting 90A to the board connecting portion 15A is also relaxed and the connection reliability of the board connecting portion 15A with the circuit board 100 can be enhanced.

Other Embodiments of Present Disclosure

The embodiments disclosed this time should be considered illustrative in all aspects, rather than restrictive.

Although the shaft portion is composed of the first shaft portion 26, 26A and the second shaft portion 27, 27A in the case of the first and second embodiments, the shaft portion may be composed of either one of the first and second shaft portions as another embodiment. In this case, a housing may include either one of first and second supporting portions.

Although the terminal fitting 10, 10A is rotatable about the fixed rotation center position in the case of the first and second embodiments, a terminal fitting may be rotatable about a rotation center position, which is displaced in a predetermined range, as another embodiment.

Although the second shaft portion 17 is formed by bending and raising the plate piece part in the cut formed in the inserting portion 13 in the case of the first embodiment, a second shaft portion may be formed by striking an inserting portion outward.

Although the strain relief portion 31 is provided between the terminal connecting portion 19A and the insertion portion 28A in the inserting portion 13A in the case of the second embodiment, a strain relief portion may be provided, for example, in a vertically intermediate part of an extending portion without being particularly limited to a position between a terminal connecting portion and a board connecting portion as another embodiment.

Although the plate thickness surface of the board connecting portion 15 is configured to contact the surface of the circuit board 100 in the case of the first embodiment, a plate surface of a board connecting portion may be configured to contact a surface of a circuit board as another embodiment, as in the second embodiment. A mating terminal fitting or housing may be provided with a guiding structure for guiding the terminal connecting portion to a position where the terminal connecting portion can be connected to the mating terminal fitting.

Although the terminal connecting portion is configured by folding the metal plate (plate material) into two layers in the case of the first embodiment, a terminal connecting portion may be configured by folding a metal plate into three or more layers as another embodiment. Further, clearances may be formed between adjacent plate surfaces of a multitude of folded layers of the metal plate.

List of Reference Numerals

| | |
|---|---|
| 10, 10A | terminal fitting |
| 11, 11A | base portion |
| 12, 12A | resilient portion |
| 13, 13A | inserting portion |
| 14, 14A | extending portion |
| 15, 15A | board connecting portion |
| 16 | folded portion |
| 17, 17A | second shaft portion (shaft portion) |
| 18 | stabilizer |
| 19, 19A | terminal connecting portion |
| 21 | guiding portion |
| 22 | bent portion |
| 23, 23A | fixed end portion |
| 24, 24A | resilient body portion |
| 25, 25A | projecting portion |
| 26, 26A | first shaft portion (shaft portion) |
| 27, 27A | bearing hole |
| 28, 28A | insertion portion |
| 29 | facing portion |
| 31 | strain relief portion |
| 60 | housing |
| 61 | back wall |
| 62 | peripheral wall |
| 63 | fitting space |
| 64 | insertion hole |
| 65 | main hole portion |
| 66 | sub-hole portion |
| 67 | inclined region of sub-hole portion |
| 68 | inclined region of main hole portion |
| 69 | slant |
| 71, 71A | first supporting portion (supporting portion) |
| 72, 72A | second supporting portion (supporting portion) |
| 73 | interfering portion |
| 74 | recess |
| 75 | groove portion |
| 80, 80A | mating housing |
| 90, 90A | mating terminal fitting |
| 91 | box portion |
| 95 | wire |
| 100 | circuit board |
| 101 | conductive portion |

What is claimed is:

1. A connector, comprising:

a housing; and a terminal fitting to be rotatably disposed in the housing, wherein:

the terminal fitting includes a terminal connecting portion to be connected to a mating terminal fitting, a board connecting portion to be connected to a circuit board and a shaft portion located between the terminal connecting portion and the board connecting portion, the housing includes a supporting portion configured to engage with the shaft portion, the terminal fitting is configured to rotate about the supporting portion when the supporting portion is engaged with the shaft portion, and the terminal fitting has a center of gravity located behind the shaft portion and toward the board connecting portion such that the terminal fitting is biased against the circuit board according to a rotation direction of the terminal fitting with respect to the housing.

2. The connector of claim 1, wherein:

the terminal fitting includes a base portion extending from the terminal connecting portion to the board connecting portion and a resilient portion provided side by side with the base portion, the resilient portion being deflectable and deformable toward the base portion, and the shaft portion is provided on the resilient portion.

3. The connector of claim 2, wherein the shaft portion is provided on an end part of the resilient portion on the side of the terminal connecting portion.

4. The connector of claim 2, wherein the resilient portion is deflected and deformed in a direction orthogonal to the rotating direction of the terminal fitting.

5. The connector of claim 2, wherein the shaft portion includes a first shaft portion provided on the resilient portion and a second shaft portion provided to project on a surface of the base portion on a side opposite to a side facing the resilient portion.

6. The connector of claim 1, wherein the terminal fitting includes a strain relief portion for allowing relative displacements of the terminal connecting portion and the board connecting portion at a position different from the shaft portion between the terminal connecting portion and the board connecting portion.

7. The connector of claim 1, wherein the terminal connecting portion, the board connecting portion and the shaft portion are integrally provided by bending a metal plate.

8. The connector of claim 7, wherein the terminal connecting portion is configured by folding the metal plate into two or more layers.

* * * * *